United States Patent
Zhang et al.

(10) Patent No.: US 11,824,411 B2
(45) Date of Patent: Nov. 21, 2023

(54) OPTIMIZATION DESIGN METHOD FOR NOISE REDUCTION OF AC TRACTION MOTOR

(71) Applicant: Hunan University of Science and Technology, Xiangtan (CN)

(72) Inventors: Xiaoping Zhang, Xiangtan (CN); Donghao Liu, Xiangtan (CN); Bo Fu, Xiangtan (CN)

(73) Assignee: Hunan University of Science and Technology, Xiangtan (CN)

( * ) Notice: Subject to any disclaimer, the term of this patent is extended or adjusted under 35 U.S.C. 154(b) by 46 days.

(21) Appl. No.: 17/456,531

(22) Filed: Nov. 24, 2021

(65) Prior Publication Data
US 2022/0302812 A1 Sep. 22, 2022

(30) Foreign Application Priority Data
Mar. 22, 2021 (CN) .......................... 202110300705.5

(51) Int. Cl.
*H02K 29/03* (2006.01)
*H02K 1/16* (2006.01)

(52) U.S. Cl.
CPC ............. *H02K 29/03* (2013.01); *H02K 1/165* (2013.01); *H02K 2201/03* (2013.01); *H02K 2213/03* (2013.01)

(58) Field of Classification Search
CPC . H02K 29/03; H02K 2201/03; H02K 2213/03
See application file for complete search history.

(56) References Cited

U.S. PATENT DOCUMENTS

| 5,359,249 A | * | 10/1994 | Tanaka | H02K 1/165 310/216.069 |
| 5,932,947 A | * | 8/1999 | Kim | F16C 32/0465 310/90.5 |
| 6,559,572 B2 | * | 5/2003 | Nakamura | H02K 15/026 310/216.071 |

(Continued)

FOREIGN PATENT DOCUMENTS

| CN | 107608934 A | 1/2018 |
| CN | 108134491 A | 6/2018 |

(Continued)

OTHER PUBLICATIONS

WO-2008136044-A1, Arata , all pages (Year: 2008).*

(Continued)

*Primary Examiner* — Naishadh N Desai
(74) *Attorney, Agent, or Firm* — Schwegman Lundberg & Woessner, P.A.

(57) ABSTRACT

To solve the problem of large electromagnetic noise in AC traction motor, embodiments have open square notches at symmetrical positions on both sides of stator teeth of AC traction motor to effectively reduce electromagnetic noise without affecting other performance indicators of motor. In addition, embodiments fit the functional relationship between the optimal notch size or optimal slotting position size of motors and their power by determining the optimal notch size or optimal slotting position size of motors with different power grades, so as to achieve the noise reduction effect.

8 Claims, 1 Drawing Sheet

(56) References Cited

U.S. PATENT DOCUMENTS

| | | | | |
|---|---|---|---|---|
| 8,569,924 | B2* | 10/2013 | Yasuda | H02K 1/146 310/216.069 |
| 8,816,562 | B2* | 8/2014 | Yoneda | H02K 15/12 310/216.093 |
| 2002/0093254 | A1* | 7/2002 | Asao | H02K 3/24 310/58 |
| 2009/0195113 | A1* | 8/2009 | Kolomeitsev | H02K 17/12 310/168 |
| 2010/0084942 | A1* | 4/2010 | Taniyama | H02K 1/265 310/216.072 |
| 2010/0277026 | A1* | 11/2010 | Yamaguchi | H02K 1/276 310/216.071 |
| 2014/0028148 | A1* | 1/2014 | Shelton | H02K 1/146 310/216.092 |
| 2021/0013820 | A1 | 1/2021 | Zhang et al. | |

FOREIGN PATENT DOCUMENTS

| | | | | |
|---|---|---|---|---|
| CN | 108539935 | A | 9/2018 | |
| CN | 110601464 | A | 12/2019 | |
| EP | 2139092 | A1 * | 12/2009 | H02K 1/265 |
| JP | 2007116801 | A * | 5/2007 | |
| WO | WO-2008136044 | A1 * | 11/2008 | H02K 1/265 |
| WO | WO-2011096888 | A1 * | 8/2011 | H02K 21/12 |
| WO | WO-2012084905 | A1 * | 6/2012 | H02K 1/02 |

OTHER PUBLICATIONS

EP-2139092-A1, Arata, all pages (Year: 2009).*
JP-2007116801-A, Atarashi, all pages (Year: 2007).*
WO-2012084905-A1, Nord, all pages; (Year: 2012).*
WO-2011096888-A1, Chua, all pages, Year 2011 (Year: 2011).*
"Chinese Application No. 202110300705.5, Chinese Search Report dated Aug. 13, 2021", (Aug. 13, 2021), 1 pgs.
"Chinese Application No. 202110300705.5, First Office Action dated Aug. 18, 2021", (Aug. 18, 2021), 6 pgs.
Si-Si, Shen, "Comprehensive Optimization of Driving Motor Operation and Vibration Performance for New Energy Vehicles", Masterchar(39)s Degree Thesis, Southwest Jiaotong University, (May 1, 2020), 80 pages.
Zhiwei, Ho, "Analysis of Electromagnetic Vibration and Noise of Low Power Permanent Magnet Synchronous Motors", Master Degree Thesis, Shanghai Institute of Electrical Machinery, (Jan. 20, 2016), 91 pages.

* cited by examiner

OPTIMIZATION DESIGN METHOD FOR NOISE REDUCTION OF AC TRACTION MOTOR

CROSS-REFERENCE TO RELATED APPLICATIONS

This Non-provisional application claims priority under 35 U.S.C. § 119(a) to Chinese Patent Application No. 202110300705.5, filed on 22 Mar. 2021, the entire contents of which are hereby incorporated by reference in its entirety.

BACKGROUND OF THE INVENTION

1. Technical Field

The present invention relates to the field of motor noise reduction, and more particularly to an optimization design method for noise reduction of AC traction motor.

2. Description of Related Art

AC traction motors have been widely used in many fields due to their simple and firm structure, reliable operation, large power, high speed and other advantages. However, large noise is produced by motors during operation, which has an adverse effect on working environment and human health, and limits their application in some special fields. Therefore, it is of great significance to carry out research on motor noise reduction.

The main cause for large noise in AC traction motors is electromagnetic noise generated during their operation. Electromagnetic noise is generated by vibrations of stator core and casing under the action of radial electromagnetic force in air-gap field on the inner wall of the stator. The interaction of stator and rotor tooth harmonic fields is one main reason for the generation of radial electromagnetic force. Therefore, weakening the radial electromagnetic force harmonics generated by stator and rotor tooth harmonic fields is critical to suppress electromagnetic noise. Domestic and foreign scholars have carried out extensive research and proposed multiple methods on the reduction of electromagnetic noise, including changing motor slot combination, skewed rotor design, changing motor air-gap length, improving motor assembly process, optimizing motor control, etc., which have achieved certain results, but there is still a certain gap with the noise reduction requirements in practice. Therefore, how to further and effectively reduce electromagnetic noise of AC traction motor is still an important research issue.

SUMMARY OF THE INVENTION

To address the technical issues left unsolved by the prior art, the present invention provides an optimization design method for noise reduction of AC traction motor with simple principle, convenient processing, and good noise reduction effect.

To address the foregoing technical issues, the embodiments provide a technical scheme, wherein:

an optimization design method for noise reduction of AC traction motor, characterized in that, it comprises the following steps:

Step (A) determine the main factor of noise generation in AC traction motor;

Step (B) establish a relational expression of radial electromagnetic force on per unit area of inner wall of motor stator;

Step (C) establish a relational expression of air-gap magnetic flux density that determines the radial electromagnetic force in air-gap field, and analyze several methods to suppress the electromagnetic noise of motor by reducing the radial electromagnetic force of motor as follows;

C1. keep air-gap magnetic permeability constant and reduce air-gap magnetic potential;

C2. keep air-gap magnetic potential constant and reduce air-gap magnetic permeability;

C3. reduce air-gap magnetic potential and air-gap magnetic permeability simultaneously;

determine the possibility of reducing the air-gap magnetic potential or air-gap magnetic permeability in practical application;

Step (D) establish a relational expression of motor magnetic circuit according to the optimal scheme C1 obtained from Step (C), increase the magnetic pressure drop of motor stator core to reduce the air-gap magnetic flux density and finally suppress the radial electromagnetic force of motor;

Step (E) analyze the main methods with which the motor magnetic circuit is modified to increase the magnetic reluctance of the motor stator core;

E1. replace with materials with higher magnetic resistance to reduce the magnetic potential of magnetic flux when it reaches the air gap after flowing through the stator teeth;

E2. open slots in the stator teeth to fill high reluctance materials to increase the magnetic reluctance of motor stator core;

E3. improve the stator tooth structure to increase the integration paths of magnetic flux when flowing through the stator teeth thus to increase the magnetic pressure drop of the stator teeth;

determine the feasibility of Methods E1, E2 and E3 in actual production, and obtain the optimal scheme E3, i.e. open square notches at symmetrical positions on both sides of stator teeth of AC traction motor, which can effectively reduce its electromagnetic noise; three schemes are available for slotting:

E31. slotting position size is fixed, and notch size is variable;

E32. notch size is fixed, and slotting position size is variable;

E33. notch size and slotting position size are both variable.

Step (F) according to the optimal scheme obtained from Step (E), select multiple groups of motors with different powers within AC traction motor power grades, open slots in the stator teeth of each group of motors in sequence, and obtain multiple groups of electromagnetic noise data;

the operations in Step (F) are realized within the AC traction motor power grades:

F1. select m groups of motors with different power grades in sequence;

F2. select the sizes of n notches sequentially in the stator teeth of each group (m groups in all) of motors with different power grades determined in Step (F1);

F3. open square notches in the m×n slotting positions of the stator teeth according to Step (F2) and perform finite element analysis on the motor to obtain the electromagnetic noise data of the m groups of motors with different power grades.

In addition, the operations in Step (F) can also be carried out as follows: Open slots at different positions of the stator teeth according to certain notch size, that is, F1'. select m groups of motors with different power grades in sequence;

F2'. select the sizes of n positions sequentially within the range from the lower end of stator wedge to the bottom of stator slot of each group (m groups in all) of motors with different power grades determined in Step (F1');

F3'. design m×n models and open corresponding square notches in the m×n positions selected according to Step (F2') and the set notch sizes, and perform finite element analysis on the motor to obtain the electromagnetic noise data of the m groups of motors with different power grades.

Similarly, scheme F3 is obtained according to the above steps, and will not be repeated herein.

Step (G) according to the electromagnetic noise and corresponding notch size or slotting position size data obtained from Step (F), obtain the functional equation between them by numerical fitting and calculate its minimum value thus to obtain the corresponding optimal notch size or optimal slotting position size of each group of motors with different power grades;

Step (H) according to the optimal notch size or optimal slotting position size and corresponding motor power data obtained from Step (G), obtain the functional equation between the optimal notch size or optimal slotting position size of AC traction motor and its power by numerical fitting, and then determine the optimal notch size or optimal slotting position size of any power grade of motors according to the functional equation so as to achieve the noise reduction effect.

The values of the notch size are determined according to the width of the stator teeth in Step (F2), and the values are within ½ of the average width of the stator teeth.

The functional equation between the electromagnetic noise and corresponding notch size of AC traction motor in Step (G) is as follows:

$$f_s(h_2)=a_6h_2^6+a_5h_2^5+a_4h_2^4+a_3h_2^3+a_2h_2^2+a_1h_2+a_0 \quad (3)$$

where, $f_s(h_2)$ is the electromagnetic noise function, $a_6$, $a_5$, $a_4$, $a_3$, $a_2$, $a_1$, and $a_0$ are the coefficients of the electromagnetic noise function, respectively, which are fitted by computer, and $h_2$ is the notch size of the stator teeth.

The functional equation between the electromagnetic noise and slotting position size of AC traction motor in Step (G) is as follows:

$$f_s(h_1)=c_6h_1^6+c_5h_1^5+c_4h_1^4+c_3h_1^3+c_2h_1^2+c_1h_1+c_0 \quad (4)$$

where, $f_s(h_1)$ is the electromagnetic noise function, $c_6$, $c_5$, $c_4$, $c_3$, $c_2$, $c_1$, and $c_0$ are the coefficients of the electromagnetic noise function, respectively, which are fitted by computer, and $h_1$ is the slotting position size of the motor, i.e. the distance between the lower end of the stator wedge and the slotting position.

The functional equation between the optimal notch size of AC traction motor and its power in Step (H) is as follows:

$$f_1(p)=b_6p^6+b_5p^5+b_4p^4+b_3p^3+b_2p^2+b_1p+b_0 \quad (5)$$

where, $f_1(p)$ is the function of the optimal notch size, $b_6$, $b_5$, $b_4$, $b_3$, $b_2$, $b_1$, and $b_0$ are the coefficients of the optimal notch size function, respectively, which are fitted by computer, and p is the motor power.

The functional equation between the optimal slotting position size of AC traction motor and its power in Step (H) is as follows:

$$h_{1,J}=H_S \cdot a \cdot p^b \quad (9)$$

where, $h_{1,J}$ is the optimal slotting position size of the motor, $H_S$ is the depth of the stator slot, p is the motor power, a and b are the coefficients of the optimal slotting position relative size function, respectively, which are fitted by computer.

The derivation of Eq. (9) is as follows: when calculating the optimal slotting position size of any power grade of motors above, first obtain the relative size x of the optimal slotting position of AC traction motor through Eq. (6), next obtain the function equation (7) between the optimal slotting position relative size x of several groups of AC traction motors and their power by numerical fitting (least square method), and then obtain the optimal slotting position size $h_{1,J}$ through Eq. (8). The equations are shown below:

$$x=h_{1,J}/H_S \quad (6)$$

$$x=f_2(p)=a \cdot p^b \quad (7)$$

$$h_{1,J}=H_S \cdot f_2(p) \quad (8)$$

where, x is the relative size of the optimal slotting position, $h_{1,J}$ is the optimal slotting position size of the motor, $H_S$ is the depth of the stator slot, $f_2(p)$ is the function of the optimal slotting position relative size, p is the motor power, a and b are the coefficients of the function of the optimal slotting position relative size, respectively, which are fitted by computer.

Embodiments may have the following beneficial effects by building the motors per the above method:

to solve the problem of large electromagnetic noise in AC traction motor, embodiments have open square notches at symmetrical positions on both sides of stator teeth of AC traction motor to effectively reduce electromagnetic noise without affecting other performance indicators of motor. In addition, embodiments fit the functional relationship between the optimal notch size or optimal slotting position size of motors and their power by determining the optimal notch size or optimal slotting position size of motors with different power grades, so as to achieve the noise reduction effect. This method reduces noise.

Figure 1:
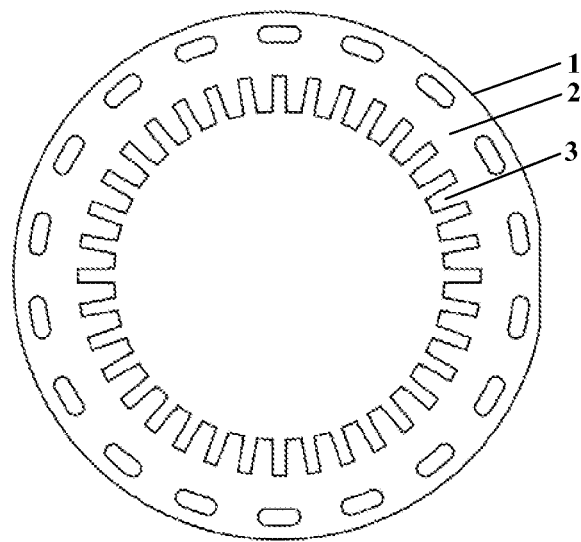
FIG. 1 is a structural schematic diagram of AC traction motor stator in an embodiment of the present invention.
Figure 2:
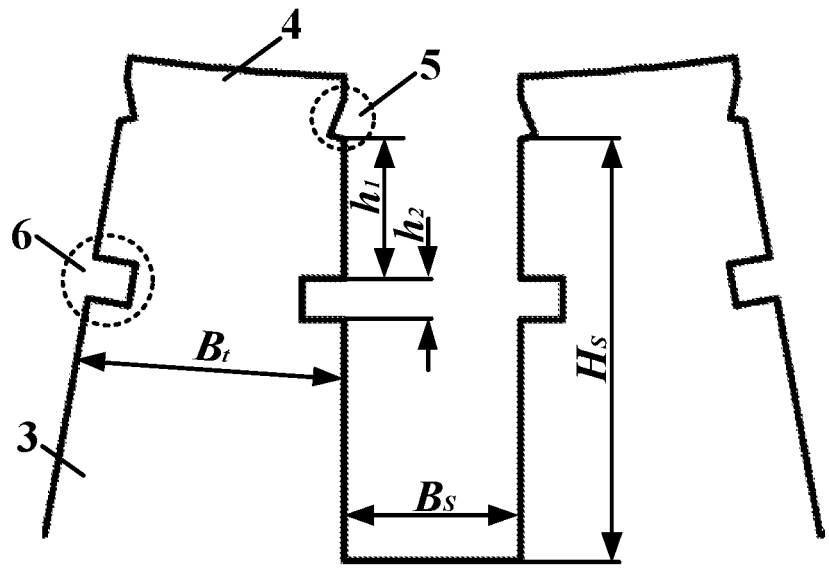
FIG. 2 is a schematic diagram of slotting in AC traction motor stator teeth in an embodiment of the present invention.

LIST OF REFERENCE NUMBERS IN THE DRAWINGS 1. stator core; 2. stator core yoke; 3. stator core teeth; 4. stator tooth tip; 5. stator wedge; 6. notch slotted in stator teeth.

DETAILED DESCRIPTION

Embodiments will be further described below with reference to the drawings and description.

Embodiment 1

(1) Analyze the main factors of noise generation in AC traction motor:

One main factor of noise generation in AC traction motor is electromagnetic noise generated during its operation. Electromagnetic noise is generated by vibrations of stator core and casing under the action of radial electromagnetic force in air-gap field on the inner wall of the stator, and the radial electromagnetic force is mainly generated due to the interaction of stator and rotor tooth harmonic fields. Therefore, effectively weakening the stator and rotor tooth harmonic fields is critical to suppress electromagnetic noise.

(2) Establish the relational expression of radial electromagnetic force on per unit area of inner wall of motor stator:

electromagnetic noise of motors is mainly generated under the action of radial electromagnetic force on the inner wall of the stator. The expression of radial electromagnetic force on per unit area of inner wall of the stator is:

$$p_n(\theta, t) = \frac{b_\delta(\theta, t)^2}{2\mu_0} \quad (1)$$

where, $b_\delta(\theta,t)$ is the air-gap magnetic flux density, $\mu_0$ is the vacuum permeability, $\mu_0=4\pi\times10^{-7}$ H/m.

(3) Establish the relational expression of air-gap magnetic flux density that determines the radial electromagnetic force in air-gap field $$b_\delta(\theta,t)=f_\delta(\theta,t)\lambda_\delta(\theta,t) \quad (2)$$

where, $f_\delta(\theta,t)$ is the air-gap magnetic potential, $\lambda_\delta(\theta,t)$ is the air-gap permeability.

Eq. (1) shows that, the radial electromagnetic force of motor mainly depends on the air-gap magnetic flux density, while Eq. (2) shows that the air-gap magnetic flux density of motor depends on the air-gap magnetic potential and the air-gap permeability. Therefore, it is necessary to reduce the radial electromagnetic force to suppress the electromagnetic noise of motor, which can be carried out in the following three ways:

C1. keep air-gap magnetic permeability constant and reduce air-gap magnetic potential;

C2. keep air-gap magnetic potential constant and reduce air-gap magnetic permeability;

C3. reduce the air-gap magnetic potential and the air-gap magnetic permeability simultaneously.

Method C1: to keep the air-gap magnetic permeability constant, the air-gap structure of motor should remain the same. To reduce the air-gap magnetic potential, the magnetic circuit of motor needs to be appropriately modified to increase the magnetic pressure drop when the magnetic flux flows through the stator core thus to reduce the magnetic potential when the magnetic flux reaches the air gap, which can be achieved by improving stator teeth structure or replacing material.

Method C2: to keep the air-gap magnetic potential constant, the design of magnetic circuit of motor should remain the same, and the structure and material of stator core through which magnetic flux flows should be the same as those of the original motor. To reduce the air-gap magnetic permeability, the air-gap structure of motor needs to be modified. The air-gap magnetic permeability can be reduced by increasing the air-gap width or modifying the structure of stator tooth tip.

Method C3: to reduce the air-gap magnetic potential and the air-gap magnetic permeability of motor simultaneously, the magnetic circuit and air-gap structure of motor need to be modified simultaneously.

When designing AC traction motors, the air-gap width is generally small as much as possible to reduce no-load current, since the power factor cos φ of squirrel-cage AC traction motor mainly depends on the no-load current. If the air gap is too small, chamber sweeping may occur, however, if the air gap is too large, motor loss may increase.

Therefore, the air-gap width of AC traction motor stator cannot be changed at will. When operations such as chamfering the stator tooth shoulder and opening auxiliary slot in the stator tooth crown are performed, although the air-gap structure is changed little, the air-gap length of motor is increased to a certain extent, and the loss of motor is increased, which will reduce the operating efficiency of motor. Therefore, the noise reduction by modifying the air-gap structure of motor is not taken as the preferred method.

(4) Considering the design of motor magnetic circuit (i.e. reduction in the air-gap magnetic potential), establish the relational expression of motor magnetic circuit according to the above optimal scheme C1, increase the magnetic pressure drop of motor stator core to a certain extent by modifying the motor magnetic circuit to reduce the air-gap magnetic flux density and finally suppress the radial electromagnetic force of motor.

(5) Analyze the main methods with which the motor magnetic circuit is modified to increase the magnetic reluctance of motor stator core:

E1. replace with materials with higher magnetic resistance to reduce the magnetic potential of magnetic flux when it reaches the air gap after flowing through the stator teeth;

E2. open slots in the stator teeth to fill high reluctance materials to increase the magnetic reluctance of motor stator core;

E3. improve the stator tooth structure to increase the integration paths of magnetic flux when flowing through the stator teeth thus to increase the magnetic pressure drop of the stator teeth.

With Method E1, the material of stator core of motor is replaced, which has a greater impact on the overall performance of motor with high cost. With Method E2, holes are opened in the stator teeth of motor and filled with high reluctance materials, which, to a certain extent, increases the difficulty and cost of motor production. With Method E3, the stator tooth structure is modified or designed. The redesign of stator tooth structure would increase motor development cost and have a greater impact on the motor performance, so the use of optimal design, such as slotting in the stator teeth, will increase the integration paths of magnetic flux so as to increase the magnetic pressure drop of the stator teeth.

With this method, in an embodiment, one can optimize the stator tooth structure (that is, open slot in the stator teeth), since it is not necessary to replace with new materials or redesign the stator tooth structure. By slotting in the original stator teeth, the radial electromagnetic force of motor can be reduced thus to suppress the electromagnetic noise, which effectively reduces the cost and period of motor production. The electromagnetic noise of motor can be effectively suppressed through a complete set of optimal design process under the premise that its efficiency is basically unchanged.

(6) According to the optimal scheme obtained from Step (5), the embodiment uses open square notches at symmetrical positions on both sides of stator teeth of AC traction motor to reduce its electromagnetic noise, with implementation steps as follows:

F1. Set the power of AC traction motor within 90 kW-410 kW, and select seven groups of motors with different power grades sequentially in this range. For example, the motor power is 90 kW, 150 kW, 190 kW, 230 kW, 300 kW, 350 kW and 410 kW.

F2. Choose any of the above seven groups of motors with different power grades. For example, a motor with a power grade of 230 kW (the main technical parameters of motor are shown in Table 1). Select seven square notch sizes with a pitch of 0.2 mm in sequence within the ½ of the average tooth width of stator teeth of motor. In the present embodiment, the notch size $h_2$ is 0.6 mm, 0.8 mm, 1.0 mm, 1.2 mm, 1.4 mm, 1.6 mm, and 1.8 mm.

TABLE 1

Main technical parameters of motor

| Rated voltage | Rated power | Depth of stator slot | Width of stator slot | Average width of stator teeth |
|---|---|---|---|---|
| 1000 V | 230 kW | 30.4 mm | 12.7 mm | 18.4 mm |

F3. Set the slotting position size $h_1$ of stator teeth to 10 mm, and open square notches corresponding to each notch size described in Step (F2) and perform finite element analysis on the motor to obtain the electromagnetic noise data of motor, as shown in Table 2.

TABLE 2

Notch size and corresponding electromagnetic noise value of 230 kW motor

| Group No. | Notch size $h_2$ (mm) | Electromagnetic noise value (dBA) |
|---|---|---|
| 1 | 0.6 | 63.972 |
| 2 | 0.8 | 59.693 |
| 3 | 1.0 | 63.9 |
| 4 | 1.2 | 73.817 |
| 5 | 1.4 | 76.935 |
| 6 | 1.6 | 59.953 |
| 7 | 1.8 | 64.522 |

(7) According to the electromagnetic noise and corresponding slotted notch size data in Table 2, obtain the functional equation (3) between them with least square method and find its minimum value thus to obtain the corresponding optimal slotted notch size of current power grade of motors;

$$f_s(h_2)=1016h_2^6-6471h_2^5+16660h_2^4-22340h_2^3+16600h_2^2-6539h_2+1132 \quad (3)$$

where, $f_s(h_2)$ is the electromagnetic noise function, and $h_2$ is the size of the notch slotted in the stator teeth.

Calculate the minimum value of Eq. (3), and obtain corresponding optimal notch size as $h_{2f}=0.78$ mm. Plug it into the above functional equation, and obtain the minimum electromagnetic noise value (59.6538 dBA).

Determine the optimal notch size and corresponding minimum electromagnetic noise value of the remaining six groups of motors in sequence, and the results are shown in Table 3.

TABLE 3

Optimal notch size and corresponding minimum electromagnetic noise value of motors with different power grades

| Group No. | Power grade (kW) | Optimal notch size (mm) | Minimum electromagnetic noise value (dBA) |
|---|---|---|---|
| 1 | 90 | 0.86 | 46.9717 |
| 2 | 150 | 0.70 | 45.9268 |
| 3 | 190 | 0.68 | 52.5408 |
| 4 | 230 | 0.78 | 59.6538 |
| 5 | 300 | 1.08 | 75.3314 |
| 6 | 350 | 1.04 | 77.4325 |
| 7 | 410 | 0.68 | 75.055 |

(8) According to the optimal notch size and corresponding motor power data in Table 3, obtain the functional equation between the optimal notch size of AC traction motor and its power with the least square method, as shown below:

$$f_1(p)=3.093\times10^{-14}p^6-4.017\times10^{-11}p^5+1.986\times10^{-8}p^4-4.782\times10^{-6}p^3+0.0006154p^2-0.04402p+2.241 \quad (4)$$

where, $f_1(p)$ is the function of the optimal notch size, and p is the motor power.

Calculate the optimal notch size of any power grade of motors using the functional equation between the optimal notch size of AC traction motor and its power and apply it (e.g., build the motors accordingly, adjust existing motors accordingly, etc.).

For example, the corresponding optimal notch size of 230 kW motor is calculated according to the functional equation obtained from Step (8): $h_2=0.79$ mm, which is basically consistent with the size of 0.78 mm obtained from Step (7), indicating that the above functional equation is feasible.

Table 4 shows the noise reduction effect of 230 kW AC traction motor before slotting and after slotting in the stator teeth of the motor according to the optimal notch size (0.79 mm).

TABLE 4

Noise value of 230 kW AC traction motor before and after slotting

| Status of motor | Noise value (dBA) |
|---|---|
| Before slotting | 76.454 |
| After slotting | 59.672 |

It can be seen that the electromagnetic noise of AC traction motor is reduced by 16.782 dBA or 21.95% after slotting in the stator teeth according to the determined optimal notch size, which shows a better noise reduction effect.

Embodiment 2

From Step F2, the present embodiment is different from Embodiment 1 in the design of slotting position size of the stator teeth:

select eight slotting position sizes at a certain interval in sequence from the lower end of the stator wedge to the bottom of the stator slot, such as: $h_1=0$ mm, 2.5 mm, 5 mm, 7.5 mm, 10 mm, 15 mm, 20 mm, and 25 mm.

F3'. Set the square notch size $h_2$ to 0.8 mm, and open square notches corresponding to each notch size described above and perform finite element analysis on the motor to obtain the electromagnetic noise data of the motor, as shown in Table 5.

TABLE 5

Slotting position size and corresponding electromagnetic noise value of 230 kW motor

| Group No. | Size of slotting position $h_1$ (mm) | Electromagnetic noise value (dBA) |
|---|---|---|
| 1 | 0 | 61.612 |
| 2 | 2.5 | 59.953 |
| 3 | 5 | 60.861 |
| 4 | 7.5 | 60.84 |
| 5 | 10 | 59.693 |
| 6 | 15 | 67.688 |
| 7 | 20 | 77.917 |
| 8 | 25 | 83.12 |

(7') According to the electromagnetic noise values and corresponding slotting position sizes in Table 5, obtain the functional equation between the electromagnetic noise and corresponding slotting position size with the least square method as follows:

$$f_s(h_1) = 142900 h_1^6 - 0.001031 h_1^5 + 0.02723 h_1^4 - 0.3204 h_1^3 - 1.681 h_1^2 - 3.3 h_1 + 61.63$$

where, $h_1$ is the size of the slotting position, i.e. the distance between the lower end of the stator wedge and the slotting position.

(8') Calculate the minimum value of the function equation obtained from Step (7'), and obtain the optimal slotting position size: $h_{1f} = 9.73$ mm corresponding to the minimum noise value of 59.9087 dBA.

(9') According to the optimal slotting position size of 9.73 mm obtained from Step (8') and the stator slot depth of 30.4 mm in Table 1, obtain the corresponding optimal slotting position relative size according to Eq. (6), $x \approx 0.32$, and then determine the optimal slotting position relative size and corresponding minimum noise value of the remaining six groups of motors, as shown in Table 6.

TABLE 6

Optimal slotting position relative size and corresponding minimum electromagnetic noise value of motors with different power grades

| Group No. | Power grade (kW) | Optimal slotting position relative size x | Minimum electromagnetic noise value (dBA) |
|---|---|---|---|
| 1 | 90 | 0.43 | 45.9285 |
| 2 | 150 | 0.39 | 44.8658 |
| 3 | 190 | 0.32 | 51.0198 |
| 4 | 230 | 0.32 | 59.9087 |
| 5 | 300 | 0.27 | 73.3654 |
| 6 | 350 | 0.28 | 75.5782 |
| 7 | 410 | 0.26 | 73.8377 |

(10') According to the optimal slotting position relative size and corresponding motor power data in Table 6, obtain the functional equation between the optimal slotting position relative size of AC traction motor and its power with the least square method, as shown below:

$$x = f_2(p) = 1.79 \cdot p^{-0.3167}$$

where, p is the motor power.

(11') According to the functional equation between the optimal slotting position relative size of AC traction motor and its power obtained from Step (10'), calculate the optimal slotting position relative size of 230 kW motor: $x \approx 0.3198$, and then calculate the corresponding optimal slotting position size according to the stator slot depth: $h_{1f} \approx 9.72$ mm, which is basically consistent with the optimal slotting position size of 9.73 mm calculated in Step (8'), indicating that the above functional equation is feasible.

According to the obtained optimal slotting position size of 9.72 mm, open 0.79 mm square notches at symmetrical positions on both sides of the stator teeth of AC traction motor and perform finite element analysis on the motor to obtain the electromagnetic noise data of motor before and after slotting as shown in Table 7.

TABLE 7

Electromagnetic noise value of 230 kW AC traction motor before and after slotting

| Status of motor | Electromagnetic noise value (dBA) |
|---|---|
| Before slotting | 76.454 |
| After slotting | 59.218 |

It can be seen that the electromagnetic noise of AC traction motor is reduced by 17.236 dBA or 22.54% after slotting in the stator teeth according to the determined optimal slotting position size, which shows a better noise reduction effect.

Although examples have been described with reference to specific example embodiments or methods, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An optimization design method for noise reduction of AC traction motor, the optimization design method comprising:
   Step (A) determine a main factor of electromagnetic noise generation in the AC traction motor;
   Step (B) establish a relational expression of radial electromagnetic force on per unit area of inner wall of a motor stator of the AC traction motor;

Step (C) establish a relational expression of air-gap magnetic flux density that determines the radial electromagnetic force in air-gap field, the air gap flux density dependent on air-gap magnetic potential and air-gap permeability, analyze a plurality of methods to suppress the electromagnetic noise of the AC traction motor by reducing the radial electromagnetic force of the motor stator of the AC traction motor, and determine the possibility of its application in practice, the plurality of methods including C1. keep the air-gap magnetic permeability constant and reduce the air-gap magnetic potential;

C2. keep the air-gap magnetic potential constant and reduce the air-gap magnetic permeability; and C3. reduce the air-gap magnetic potential and the air-gap magnetic permeability simultaneously;

Step (D) establish a relational expression of motor magnetic circuit according to an optimal method obtained from the plurality of methods, increase the magnetic pressure drop of a motor stator core to reduce the air-gap magnetic flux density, and finally suppress the radial electromagnetic force of the motor stator of the AC traction motor;

Step (E) analyze main methods with which motor magnetic circuit is modified to increase the magnetic reluctance of motor stator core, and obtain an optimal method from the main methods;

Step (F) according to the optimal method obtained from Step (E), select multiple groups of motors with different powers within AC traction motor power grades, open slots in the stator teeth of each group of motors in sequence, the slots varying in size, and obtain multiple groups of electromagnetic noise data;

Step (G) according to the electromagnetic noise data and corresponding slot size obtained from Step (F), obtain the functional equation between the electromagnetic noise data and the corresponding slot size by numerical fitting and calculate its minimum value thus to obtain the corresponding optimal slot size of each power grade of motors; and Step (H) according to the optimal slot size and corresponding motor power data obtained from Step (G), obtain a functional equation between the optimal slot size of AC traction motor and its power by numerical fitting, and then determine and apply the optimal slot size of any power grade of motors according to the functional equation so as to achieve the electromagnetic noise reduction;

wherein the functional equation between the optimal slot size of AC traction motor and its power is $$h_U = H_S \cdot a \cdot p^b \quad (9);$$

where, $h_U$ is the optimal slotting position size of the motor, $H_S$ is the depth of the stator slot, p is the motor power, a and b are the coefficients of the optimal slotting position relative size function, respectively, which are fitted by a computer.

2. The optimization design method for noise reduction of AC traction motor according to claim 1, wherein the main methods of increasing the magnetic reluctance of motor stator core in Step (E) are selected from the following:

E1: replace with materials with higher magnetic resistance to reduce the magnetic potential of magnetic flux when it reaches the air gap after flowing through the stator teeth;

E2: open slots in the stator teeth to fill high reluctance materials to increase the magnetic reluctance of motor stator core;

E3: improve the stator tooth structure to increase the integration paths of magnetic flux when flowing through the stator teeth thus to increase the magnetic pressure drop of the stator teeth; and determine the feasibility of Methods E1, E2 and E3 in actual production, and determine method scheme E3 as optimal, which can effectively reduce its electromagnetic noise, wherein three schemes are available for slotting:

E31: slotting position size is fixed, and notch size is variable;

E32: notch size is fixed, and slotting position size is variable; and

E33: notch size and slotting position size are both variable.

3. The optimization design method for noise reduction of AC traction motor according to claim 1, wherein the operations in Step (F) are realized within AC traction motor power grades:

F1: select m groups of motors with different power grades in sequence;

F2: select the sizes of n notches sequentially in the stator teeth of each group (m groups in all) of motors with different power grades determined in Step F1; and F3: open square notches in the m×n slotting positions of the stator teeth according to Step F2 and perform finite element analysis on the motor to obtain the electromagnetic noise data of the m groups of motors with different power grades.

4. The optimization design method for noise reduction of AC traction motor according to claim 1, wherein the operations in Step (F) are as follows:

F1': select m groups of motors with different power grades in sequence;

F2': select the sizes of n positions sequentially within the range from the lower end of stator wedge to the bottom of stator slot of each group (m groups in all) of motors with different power grades determined in Step F1'; and F3': design m×n models and open corresponding square notches in the m-n positions selected according to Step F2' and the set notch sizes, and perform finite element analysis on the motor to obtain the electromagnetic noise data of the m groups of motors with different power grades.

5. The optimization design method for noise reduction of AC traction motor according to claim 3, wherein the values of the notch size are determined according to the width of stator teeth in Step F2, and the values are within ½ of the average width of the stator teeth.

6. The optimization design method for noise reduction of AC traction motor according to claim 3, wherein the functional equation between the electromagnetic noise and corresponding notch size of AC traction motor in Step (G) is as follows:

$$f_s(h_2) = a_6 h_2^6 + a_5 h_2^5 + a_4 h_2^4 + a_3 h_2^3 + a_2 h_2^2 + a_1 h_2 + a_0 \quad (3);$$

where, $f_s(h_2)$ is the electromagnetic noise function, $a_6$, $a_5$, $a_4$, $a_3$, $a_2$, $a_1$, and $a_0$ are the coefficients of the electromagnetic noise function, respectively, which are fitted by computer, and $h_2$ is the notch size of the stator teeth.

7. The optimization design method for noise reduction of AC traction motor according to claim 4, wherein the functional equation between the electromagnetic noise and slotting position size of AC traction motor in Step (G) is as follows:

$$f_s(h_1)=c_6h_1^6+c_5h_1^5+c_4h_1^4+c_3h_1^3+c_2h_1^2+c_1h_1+c_0 \qquad (4);$$

where, $f_s(h_1)$ is the electromagnetic noise function, $c_6$, $c_5$, $c_4$, $c_3$, $c_2$, $c_1$, and $c_0$ are the coefficients of the electromagnetic noise function, respectively, which are fitted by computer, and $h_1$ is the slotting position size of the motor (the distance between the lower end of the stator wedge and the slotting position).

8. The optimization design method for noise reduction of AC traction motor according to claim 6, wherein the functional equation between the optimal notch size of AC traction motor and its power in Step (H) is as follows:

$$f_1(P)=b_6p^6+b_5p^5+b_4p^4+b_3p^3+b_2p^2+b_1p+b_0 \qquad (5);$$

where, $f_1(p)$ is the function of the optimal notch size, $b_6$, $b_5$, $b_4$, $b_3$, $b_2$, $b_1$, and $b_0$ are the coefficients of the optimal notch size function, respectively, which are fitted by computer, and p is the motor power.

\* \* \* \* \*